United States Patent Office 2,717,263
Patented Sept. 6, 1955

2,717,263

CONDENSATION PRODUCTS OF α-AMINO ACIDS AND PHENOLS

Leonard L. McKinney, Eugene A. Setzkorn, and Eugene H. Uhing, Peoria, Ill., assignors to the United States of America as represented by the Secretary of Agriculture No Drawing. Application October 3, 1952,
Serial No. 313,086

6 Claims. (Cl. 260—471)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to new compositions of matter comprising the condensation products of α-amino acids, aldehydes, and phenols or phenolic compounds. It relates more particularly to the reaction products of phenols, cresols, xylenols, resorcinol, A-stage phenolic resins and the like, with certain derivatives of amino acid compounds. The amino acid derivatives of this invention are α-amino acids or N-β-propionic acid substituted α-amino acids that have been reacted with an aldehyde such as formaldehyde and furfural before condensation with the phenolic constituent.

This invention relates further to methods of preparing these novel condensation products by one- or two-stage reactions as will be more fully described in the following specification.

The exact structure of many of the reaction products is unknown, and in many cases the reaction is believed to give a mixture of products. The structure of the products, in general, however may be represented by the following formula:

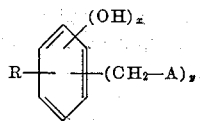

for those occurring as monomers, in which A represents the residue of an amino acid, linked to the methylene group through a nitrogen atom, as for example the group

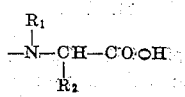

which may be in the free acid form as shown, or may have the hydrogen of the carboxyl group replaced by a metal cation. In the formula, $x$ is a low whole number as 1 or 2, and $y$ may be a whole number up to 3, R is hydrogen or a hydrocarbon radical such as alkyl, $R_1$ is hydrogen, —$CH_2CH_2COOH$, or an acyl radical such as acetyl, benzoyl or the like, and $R_2$ is the residual group of the α-amino acids.

In polymeric form, substituted phenolic molecules of the foregoing formula are linked together by means of methylene groups in the manner of the usual phenol-formaldehyde structure:

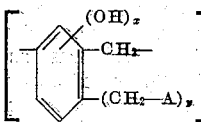

As an example of the latter, the following formula illustrates the product obtained from formaldehyde-treated α-amino acids with a water-soluble, A-stage phenolic resin:

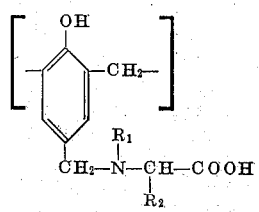

in which $R_1$ is hydrogen or $CH_2CH_2COOH$ and $R_2$ denotes the residual group of the α-amino acids, i. e. H for glycine, $CH_3$ for alanine, etc., in any of their optical isomeric or their racemic forms.

The free acid forms of the compounds particularly the monomers may be readily transformed into the corresponding salts or esters. Those in which the H of the carboxyl groups is replaced by X, the cation of the salt form or an alkyl radical of the ester form have extended utility, the former being useful as wetting and dispersing agents and the latter as ingredients in plastics. The esters of the novel class of compounds, particularly those in which the $R_2$ is an alkyl radical, are useful as plasticizers.

The new products of this invention exhibit properties entirely different from those of the parent phenolic substance used in their preparation. Because of the nature of the dipolar properties of the amino acid portion, they are usually insoluble in acetone, and often insoluble in alcohol. The water solubility is usually increased, although many of the products are insoluble in water, especially when the larger amino acids such as leucine are used; at the same time they exhibit increased solubility in aqueous alkali and ammonia. The more highly substituted phenols give polycarboxylic acid compounds. This is especially true when N-beta propionic acid derivatives are condensed with phenols.

The compounds of this invention have a wide variety of uses. The polycarboxylic acid products are useful as chemical intermediates, especially in the production of resins and plasticizers. The alkali salts, and, in some cases even the acidic products, have foaming properties and reduce the surface tension of water to a marked degree, indicating their application as emulsifying agents for use with insecticide sprays and the like. The alkali salts of products made by condensing formaldehyde, amino acid, and A-stage phenolic resins disperse proteins, for example, casein and soybean protein, and the resulting dispersion is more viscous than either protein or polymer alone with the same solids content. Since these modified resins are completely miscible with protein dispersions, they are also useful as ingredients in adhesives and glue.

The process of this invention is carried out by the interaction of a phenol compound of the following formula:

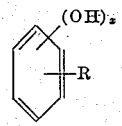

or an A-stage resin prepared by condensing these phenols and formaldehyde, with an α-amino acid of the following formula:

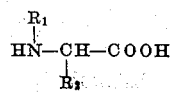

and formaldehyde, or, alternatively with the condensation product of substantially equimolar proportions of the amino acid and formaldehyde. Thus, formaldehyde may be reacted with the amino acid before reaction with the phenol, or it may be added to the amino acid-phenol mixture, or the three ingredients may be added together.

It has been discovered that the reaction of this invention is apparently a condensation reaction between the phenol ingredient and the methylol or methylene derivative of the amino acid. The condensation will not take place if the formaldehyde is first reacted with the phenol. Nevertheless, since formaldehyde reacts with amino groups much more rapidly than with phenols, the condensation can be carried out in one step.

In the specification and claims the term "A-stage phenolic resin" refers to the soluble, fusible condensation product of phenolic compounds, such as those previously mentioned, and an aldehyde such as formaldehyde. In the A-stage resin preparation, and also in the condensation process of this invention formaldehyde may be substituted by a formaldehyde yielding substance such as paraform, trioxymethylene or hexamethylene-tetramine.

When the phenol constituent is an A-stage phenolic resin it has been found to be virtually the equivalent of unreacted phenols in the reaction. Thus, even though the A-stage resin may contain methylol groups within the molecule, the additional formaldehyde must be present together with the amino acid in a single stage reaction.

The pH of the reaction mixture is not critical. The reaction occurs readily in aqueous solutions (which may contain ethanol) between pH 3 and pH 11. In order to obtain highly substituted phenols however, we have found that the reaction occurs more readily if the alkali or alkaline earth salts of both the amino acid and the phenol are employed. This is particularly advisable when using such insoluble amino acids as leucine.

According to the present invention, only low molecular weight polymers are obtained by condensing amino acids, formaldehyde, and phenols or by the interaction of formaldehyde-treated amino acids with phenols. This behavior of phenols in the presence of formaldehyde or formaldehyde compounds is uncharacteristic and may be explained by inactivation of phenols after condensation with the methylol or methylene derivative of the amino acid. Also, the reaction sequence may be blocked by phenol that has but one reactive position left. The reaction may be illustrated schematically as follows, the equation illustration the condensation of alkaline and formaldehyde followed by condensation of the product with resorcinol.

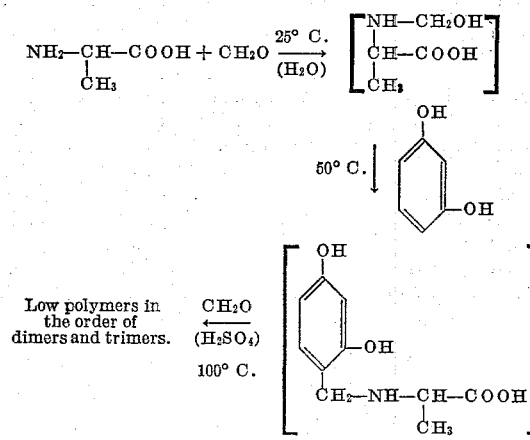

The products obtained by replacing preformed A-stage phenolic polymers for the phenol constituent possess appreciable viscosity. As previously stated, such products possess the property of dispersing proteins, the resulting dispersion being more viscous than either constituent alone.

*Example 1*

One mole (89.09 grams) of DL-alanine was dissolved in 200 cc. of water containing one mole (40.09 g.) of sodium hydroxide to give a solution of sodium alaninate. One mole (77.0 cc. of formalin) of formaldehyde was then added and the mixture allowed to stand at room temperature for 5 hours. One-half mole (47.05 g.) of phenol was added and the solution was refluxed for 2 hours. The reaction product was precipitated by adding one-half mole of barium chloride. The precipitate was washed thoroughly with boiling water to remove any unreacted alanine and phenol and then dried. The precipitate weighed 125 grams (95 percent yield) and contained 4.97 percent nitrogen (calculated 5.22 percent) and 27.9 percent barium (calculated 26.1 percent) which agreed with the following formula:

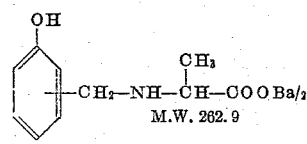

Calcium or other alkaline earth metal soluble salt may be substituted for the barium chloride to effect precipitation of the corresponding metal salt. It is therefore apparent that only one alanine had condensed with each phenol although two alanines were available to react. As further evidence for the structure of the product, the barium salt was neutralized with sulfuric acid and the insoluble barium sulfates removed. The filtrate, containing the free acid was evaporated to dryness, dissolved in ethanol and treated with dry hydrogen chloride to give the ester hydrochloride which precipitated from the reaction mixture:

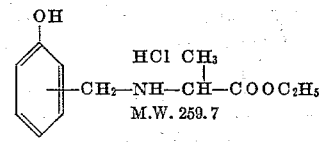

*Anal.*—Calcd.: N, 5.4; Found: N, 5.6.

The free ester was obtained by neutralizing with sodium hydroxide, evaporating the solution to dryness, dissolving in acetone and precipitating by the addition of ether. The nitrogen content was 6.34 percent (calculated 6.28 percent).

The free ester was acetylated by dissolving in acetic acid and adding one equivalent of acetic anhydride:

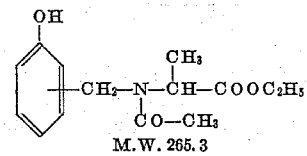

*Anal.*—Calcd.: N, 5.27; Found: N, 5.18. M. P. 110°–116° C. The melting point range of 5° indicates a mixture of ortho and para addition products.

*Example 2*

One mole (75.06 g.) of glycine and 0.33 mole (31.49 g.) of phenol was dissolved in 400 cc. of water containing 0.67 mole of barium hydroxide to give the barium salt of both glycine and phenol. One mole (76.9 cc. of 29 percent) of formaldehyde was added and the reaction mixture refluxed on a steam bath for one hour. The reaction mixture was acidified with 0.67 mole of sulfuric acid and the precipitated barium sulfate removed by centrifuging. This precipitate carried down some of the product which was not recovered. The clear supernatant solution was evaporated to dryness to give 108 grams of residue which was insoluble in acetone. It was washed with 300 cc. of acetone to remove any unreacted phenol and formolized glycine. The loss in weight was only one gram showing substantially complete reaction and an over-all yield of 90 percent. The nitrogen content was 11.8 percent (calculated 11.6 percent) agreeing with the following compound:

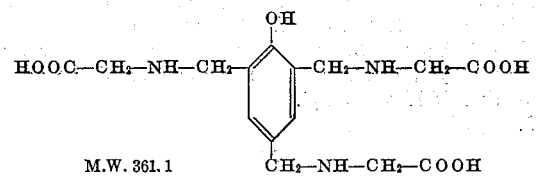

M.W. 361.1

These results show the increased reactivity of phenolate as compared with free phenol in Example 1.

*Example 3*

One-fourth mole (18.75 grams) of glycine was dissolved in 75 cc. of water and 0.50 mole (38.5 cc. of formalin) was added. One-fourth mole of para-cresol, dissolved in 85 cc. of ethyl alcohol was added and the mixture refluxed for 9 hours. After evaporating to a thick sirup, 150 cc. of ethyl alcohol was added to give a clear solution, indicating the absence of free glycine. Four volumes of water was added and about one-half of the reaction products precipitated. This water-insoluble product contained 6.0 percent nitrogen was soluble in alcohol and insoluble in acetone. It softened at 150° C. and melted at 220° C.

The filtrate, containing about one-half of the reaction product, was evaporated to dryness to give a yellow powder which was also soluble in alcohol and insoluble in acetone. This product contained 7.3 percent nitrogen, softened at 120° C., and melted to a yellow liquid at 220° C. An aqueous solution of this product foamed extensively and no precipitate was formed upon the addition of small amounts of calcium chloride.

*Example 4*

One-fourth mole (18.7 grams) of glycine and 0.50 mole (47.05 g.) of phenol were dissolved in 300 cc. of water containing 0.75 mole (30.0 g.) of sodium hydroxide. One-half mole (38.5 cc. formalin) was added and the mixture held at 90° C. for one hour. The reaction mixture was neutralized with 0.75 mole of hydrochloric acid whereupon an oily layer appeared. This layer was separated and dried. The nitrogen content was 4.43 percent (calculated 4.83) indicating that the following product was formed:

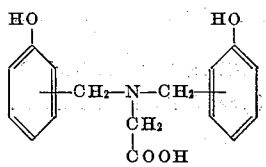

*Example 5*

One-fourth mole (32.75 g.) of leucine was dissolved in 200 cc. of water containing 0.25 mole (10.0 g.) of sodium hydroxide and 0.25 mole of formaldehyde added. After standing for 30 minutes to allow the formaldehyde to react with sodium leucinate, 0.125 mole (13.5 g.) of cresol, dissolved in 75 cc. of ethyl alcohol, was added and the mixture refluxed for 6 hours. Less than one gram of unreacted leucine could be isolated from the reaction product. The sodium salt of the reaction product was obtained by evaporating a portion of the reaction mixture to dryness, dissolving in ethyl alcohol, filtering to remove a small amount of alcohol-insoluble material, and evaporating off the alcohol. The dry material contained 5.8 percent nitrogen.

The free acid of the reaction product precipitated on acidifying a second portion of the reaction mixture with hydrochloric acid. This precipitate was soluble in ethyl alcohol and contained 5.2 percent nitrogen, which indicated the presence of 1.45 leucine residues per cresol unit.

A 1-percent solution of the sodium salt had a surface tension of 40 dynes per sq. cm. and an oil-water interfacial tension of 5.7 dynes per sq. cm. Aqueous solutions of this salt foamed readily on being agitated.

*Example 6*

Three-tenths mole (39.3 g.) of leucine was dissolved in 150 cc. of water containing 0.3 mole (12 g.) of sodium hydroxide, and 0.3 mole (23.1 cc. of formalin) was added to give the methylol derivative of sodium leucinate. One-tenth mole (9.4 g.) of phenol, dissolved in 75 cc. of ethyl alcohol, was added and the mixture refluxed for 7 hours. Upon acidifying with an equivalent amount of hydrochloric acid, the reaction product precipitated. This product was insoluble in both water and alcohol. It was washed free of chlorides with water to give a product containing 6.18 percent nitrogen which by calculation indicates 2.3 leucine residues per phenol unit.

A 1-percent solution of the sodium salt had a surface tension of 39 dynes per sq. cm. and an oil-water interfacial tension of 23.5 dynes per sq. cm. This product did not produce foam as readily as the one obtained in Example 5. Metallic ion stability was obtained by titrating 10 cc. of a 1-percent solution of the sodium salt with a 1-percent solution of the metallic salt until a precipitate was noted. The metallic stability value was then obtained by multiplying the volume of metallic salt used by 10. The results were as follows: Calcium 20, magnesium 95, barium 66, copper 37.5, iron 63, lead 48, nickel 50, and zinc 32.

*Example 7*

N-(2-carboxyethyl)-glycine was prepared as described in Example 1, U. S. Patent 2,562,198. Three-eighths mole (55.1 g.) of this compound was dissolved in 500 cc. of water containing 0.375 mole (118.32 g.) of barium hydroxide octahydrate to give a solution of the barium salt. A solution (175 cc.) of barium phenolate (⅛ mole) was added. This mixture was cooled to 15° C. and 0.5 mole (38.5 cc. of formalin) of formaldehyde added slowly over a period of 30 minutes while stirring. The temperature was then raised to 25°–30° for 1½ hours, followed by ¾ hour at 75° C., then refluxed for 1½ hours, and finally heated at 75° C. in an open beaker for ¾ hour. The reaction mixture was acidified with 7/16 mole (24.01 cc.) of sulfuric acid and the barium sulfate removed by centrifuging. The clear supernatant was evaporated to a sirup. The dried product contained 7.22 percent nitrogen (calculated 7.35) and softened at 75° C. It started to decompose at 135° C. It was soluble in water and insoluble in ethanol. The color was dark red but was readily bleached to light yellow with sulfur dioxide. The product has the following structure:

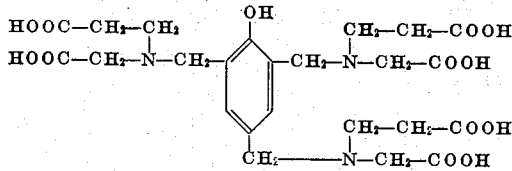

*Example 8*

A soluble A-stage phenolic resin was prepared as follows:

100 grams phenol,
60 grams formalin,
1 gram oxalic acid.

One-half of the formalin was added and after refluxing 2 hours, the water was distilled off. This process was repeated with one-half of the remaining formalin, then the remainder of the formalin added. After refluxing 2 hours, the temperature was raised to 180° C. and the water distilled off using a water pump vacuum. The molten resin was poured into a pan; yield, 90 grams.

Thirty grams of the above resin was dissolved in 200 cc. of ethanol and added to 250 cc. of an aqueous solution containing potassium alaninate equivalent to the phenol in the resin (0.283 mole). Formalin (22 cc.) was added and the clear solution was refluxed for 4 hours. Upon evaporating to dryness a viscous sirup was obtained which was insoluble in ethanol. The acidified reaction product was insoluble in both ethanol and water.

In a second preparation a crude mixture of amino acids recovered as a byproduct cake from the manufacture of monosodium glutamate was used. This mixture contained 6.86 percent nitrogen and the main constituents were: Leucine 50 percent, isoleucine 10 percent, tyrosine 12 percent, and methionine 5 percent. The mixed amino acids (57.8 g.) was dissolved in water containing sodium hydroxide equivalent to the nitrogen (0.283 mole). The ground resin was suspended in this aqueous solution and 22 cc. of formalin added. After refluxing for 3 hours a clear solution was obtained. A portion of this reaction product was acidified with hydrochloric acid equivalent to the sodium present (0.283 mole) and evaporated to dryness. Salt was removed by dissolving the dry resin in absolute ethanol. The remainder of the reaction mixture which was rather viscous was used to prepare dispersions of soybean protein. The protein dispersed readily with added water to give dispersions more viscous than either the protein or resin alone at the same solids content. The two polymers were completely compatible with each other.

In the foregoing procedure the sodium hydroxide may be replaced by any other alkali metal hydroxide.

We claim:

1. A compound of the formula:

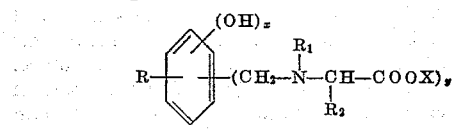

in which $x$ is an integer selected from the group consisting of 1 and 2, $y$ is an integer selected from the group consisting of 1, 2, and 3, R is a member of the group consisting of H and alkyl, $R_1$ is a member of the group consisting of H, $CH_2CH_2COOX$ and an organic acyl radical, X is a member of the group consisting of a cation and an alkyl radical, and $R_2$ is the residual group of an α-amino acid of natural occurrence.

2. A compound of the formula:

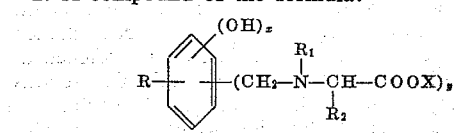

in which $x$ is an integer consisting of 1 and 2, $y$ is an integer selected from the group consisting of 1, 2, and 3, R is a member of the group consisting of H and alkyl, $R_1$ is a member of the group consisting of H, $CH_2CH_2COOX$ and an organic acyl radical, X is a member of the group consisting of a cation and an alkyl radical, and $R_2$ is a member of the group consisting of H and alkyl.

3.

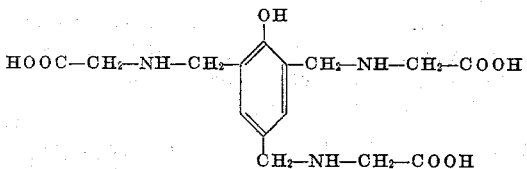

4.

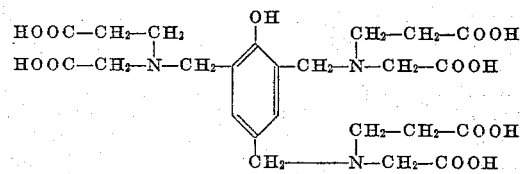

5.

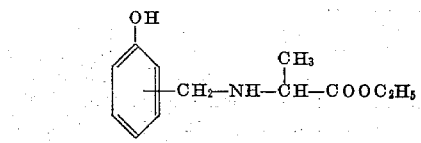

6.

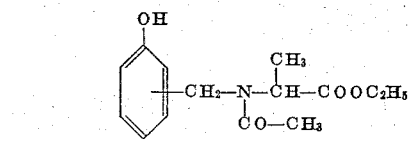

References Cited in the file of this patent

UNITED STATES PATENTS

| | | |
|---|---|---|
| 1,933,799 | Gillice | Nov. 7, 1933 |
| 2,153,804 | Jones | Apr. 11, 1939 |
| 2,229,187 | Peyer | Jan. 21, 1941 |
| 2,247,772 | D'Alelio | July 1, 1941 |
| 2,373,547 | D'Alelio | Apr. 10, 1945 |

FOREIGN PATENTS

| | | |
|---|---|---|
| 470,335 | Great Britain | Aug. 6, 1937 |